United States Patent
Anand et al.

(10) Patent No.: US 12,157,480 B2
(45) Date of Patent: Dec. 3, 2024

(54) METHOD FOR TRANSFERRING CONTROL OVER VEHICLE IN AUTOMOTIVE ELECTRONIC SYSTEM, AND APPARATUS

(71) Applicant: NIO TECHNOLOGY (ANHUI) CO., LTD, Hefei (CN)

(72) Inventors: Ashish Anand, Shanghai (CN); Jiahao Wang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 212 days.

(21) Appl. No.: 17/867,875

(22) Filed: Jul. 19, 2022

(65) Prior Publication Data
US 2023/0065148 A1   Mar. 2, 2023

(30) Foreign Application Priority Data
Aug. 24, 2021   (CN) .......................... 202110976144.0

(51) Int. Cl.
*B60W 50/035*   (2012.01)
*B60W 50/02*   (2012.01)
(Continued)

(52) U.S. Cl.
CPC ...... *B60W 50/035* (2013.01); *B60W 50/0205* (2013.01); *B60W 50/14* (2013.01);
(Continued)

(58) Field of Classification Search
CPC ............ B60W 50/035; B60W 60/005; B60W 50/0205; B60W 50/14; B60W 2556/45;
(Continued)

(56) References Cited

U.S. PATENT DOCUMENTS 9,963,106 B1 *  5/2018  Ricci ...................... G08G 1/017
10,241,509 B1 *  3/2019  Fields ................ B62D 15/0285
(Continued)

FOREIGN PATENT DOCUMENTS

CA         3170637 A1 *  9/2021  ............ B60W 50/00
CN    117508225 A  *  2/2024
(Continued)

*Primary Examiner* — Atul Trivedi
(74) *Attorney, Agent, or Firm* — Sheridan Ross P.C.

(57) ABSTRACT

The disclosure relates to the intelligent vehicle driving technologies, and in particular, to a method for transferring control over a vehicle in an automotive electronic system, an automotive electronic system and a computer-readable storage medium for implementing the method, and a vehicle including the automotive electronic system. An automotive electronic system according to an aspect of the disclosure includes a first control domain and a second control domain that are communicatively coupled to each other, where the first control domain includes a first memory, a first domain controller, and a first computer program stored on the first memory and executable on the first domain controller, and the first computer program is executed to: generate, in response to an event that triggers a transfer of control over a vehicle, a request to transfer the control over the vehicle; and display, via the second control domain as a first transmission channel or a second transmission channel, the request to transfer the control over the vehicle, where the first transmission channel takes priority over the second transmission channel in being used to display the request to transfer the control over the vehicle, and where the second transmission channel is physically independent from the second control domain.

18 Claims, 6 Drawing Sheets

(51) Int. Cl.
    *B60W 50/14*     (2020.01)
    *B60W 60/00*     (2020.01)
    *G08B 25/10*     (2006.01)

(52) U.S. Cl.
    CPC ........... *B60W 60/005* (2020.02); *G08B 25/10* (2013.01); *B60W 2050/143* (2013.01); *B60W 2050/146* (2013.01); *B60W 2556/45* (2020.02)

(58) Field of Classification Search
    CPC ...... B60W 2050/143; B60W 2050/146; G08B 25/10
    USPC .......................................................... 701/24
    See application file for complete search history.

(56) References Cited

U.S. PATENT DOCUMENTS

| | | | |
|---|---|---|---|
| 10,384,690 B2 * | 8/2019 | Ravichandran | B60W 50/14 |
| 2017/0249839 A1 * | 8/2017 | Becker | G08G 1/096725 |
| 2017/0310827 A1 * | 10/2017 | Mehta | H04W 80/04 |
| 2017/0372431 A1 * | 12/2017 | Perl | G07C 5/008 |
| 2018/0136653 A1 * | 5/2018 | Tao | B60W 60/0016 |
| 2018/0281794 A1 * | 10/2018 | Ravichandran | B60K 35/00 |
| 2018/0376301 A1 * | 12/2018 | Park | H04W 64/006 |
| 2019/0243371 A1 * | 8/2019 | Nister | G05D 1/617 |
| 2019/0335307 A1 * | 10/2019 | Marzorati | H04W 4/90 |
| 2021/0064027 A1 * | 3/2021 | Fields | B60W 50/14 |
| 2021/0229667 A1 * | 7/2021 | Miyamoto | B62D 15/021 |
| 2022/0365530 A1 * | 11/2022 | Foster | B60W 60/0015 |
| 2023/0065148 A1 * | 3/2023 | Anand | B60W 60/005 |
| 2023/0186870 A1 * | 6/2023 | Cristache | H04W 12/68 345/204 |
| 2023/0256958 A1 * | 8/2023 | Lee | B60W 40/02 701/41 |

FOREIGN PATENT DOCUMENTS

| | | | | |
|---|---|---|---|---|
| DE | 112019004071 T5 | * | 5/2021 | ............ B60W 50/00 |
| DE | 102021127988 A1 | * | 5/2022 | ...... B60W 30/18072 |
| KR | 20210090301 A | * | 7/2021 | .......... B60W 30/165 |
| WO | WO-2020193893 A1 | * | 10/2020 | ............. B60R 21/00 |

* cited by examiner

METHOD FOR TRANSFERRING CONTROL OVER VEHICLE IN AUTOMOTIVE ELECTRONIC SYSTEM, AND APPARATUS

CROSS-REFERENCE TO RELATED APPLICATION

This application claims the benefit of China Patent Application No. 202110976144.0 filed Aug. 24, 2021, the entire contents of which are incorporated herein by reference in its entirety.

TECHNICAL FIELD

The disclosure relates to the intelligent vehicle driving technologies, and in particular, to a method for transferring control over a vehicle in an automotive electronic system, an automotive electronic system and a computer-readable storage medium for implementing the method, and a vehicle including the automotive electronic system.

BACKGROUND ART

Autonomous vehicles rely on cooperation between artificial intelligence, visual computing, radar, a monitoring apparatus, a global positioning system, etc., so that a computer can autonomously and safely operate a motor vehicle without any active operation from human. In an autonomous vehicle driving technology, a video camera, a radar sensor, and a laser rangefinder are included and used to get information about surrounding traffic conditions, and a detailed map is used to provide navigation on roads ahead.

At a current stage, the goal of autonomous driving is to implement a high level of automation of driving. At this level, an autonomous driving domain controller can replace a driver to assume the work of operating a vehicle within a long or short period of time. However, a system for the driver to monitor driving activities is still needed.

In view of this, a method and an apparatus that can reliably transfer control over the vehicle from the autonomous driving domain controller to the driver need to be provided.

SUMMARY OF THE DISCLOSURE

Embodiments of the disclosure provide a method for transferring control over a vehicle in an automotive electronic system, an automotive electronic system and a computer-readable storage medium for implementing the method, and a vehicle including the automotive electronic system, which can provide a reliable transfer of control over a vehicle.

According to an aspect of the disclosure, there is provided an automotive electronic system, including a first control domain and a second control domain that are communicatively coupled to each other, where the first control domain includes a first memory, a first domain controller, and a first computer program stored on the first memory and executable on the first domain controller, and the first computer program is executed to:

generate, in response to an event that triggers a transfer of control over a vehicle, a request to transfer the control over the vehicle; and display, via the second control domain as a first transmission channel or a second transmission channel, the request to transfer the control over the vehicle, where the first transmission channel takes priority over the second transmission channel in being used to display the request to transfer the control over the vehicle, and where the second transmission channel is physically independent from the second control domain.

Optionally, in the automotive electronic system, the second transmission channel is implemented as a vehicle-mounted emergency call system.

Optionally, in the automotive electronic system, the first control domain and the second control domain are an autonomous driving domain and an intelligent cockpit domain respectively.

Optionally, the automotive electronic system further includes an output device associated with the second control domain, and the first computer program is executed to display the request to transfer the control over the vehicle in the following manner sending the request to transfer the control over the vehicle to the second control domain, so that the second control domain displays the request to transfer the control over the vehicle; or sending, via the second transmission channel in response to one of the following trigger events, the request to transfer the control over the vehicle, so that the second transmission channel displays the request to transfer the control over the vehicle:

a report of the second control domain being in an anomalous state is received from the second control domain;

a report of a failure of the output device to display the request to transfer the control over the vehicle is received from the second control domain; and the second control domain has not returned a message for acknowledging that the request to transfer the control over the vehicle is received.

Optionally, in the automotive electronic system, the second control domain includes a second memory, a second domain controller, and a second computer program stored on the second memory and executable on the second domain controller, and the second computer program is executed to:

determine whether a sound signal output by the output device is received or whether the sound signal includes information about the transfer of the control over the vehicle; and if the sound signal output by the output device or the sound signal does not include the information about the transfer of the control over the vehicle, generate the report of a failure of the output device to display the request to transfer the control over the vehicle.

Optionally, in the automotive electronic system, the second control domain and the second transmission channel are powered by power supplies independent from each other.

Optionally, in the automotive electronic system, the anomalous state includes at least one of the following: a power supply voltage of the second domain controller being out of a specified range, the second memory being faulty, and a communication circuit in the second control domain being faulty.

According to another aspect of the disclosure, there is provided a vehicle, including an automotive electronic system, where the automotive electronic system includes various features described above or a combination thereof.

According to another aspect of the disclosure, there is provided a method for transferring control over a vehicle in an automotive electronic system, where the automotive electronic system includes a first control domain and a second control domain that are communicatively coupled to each other, and the method includes the following steps:

generating, by the first control domain in response to an event that triggers a transfer of control over a vehicle, a request to transfer the control over the vehicle; and displaying, by the first control domain via the second control domain as a first transmission channel or a second transmission channel, the request to transfer the control over the vehicle, where the first transmission channel takes priority over the second transmission channel in being used to transmit the request to transfer the control over the vehicle, and where the second transmission channel is physically independent from the second control domain.

According to another aspect of the disclosure, there is provided a computer-readable storage medium storing a computer program thereon, where the program, when executed by a processor, implements the method described above.

In some embodiments of the disclosure, a redundant transmission channel is provided for displaying the request to transfer the control over the vehicle, such that reliability is improved. In addition, when a vehicle-mounted emergency call system is used to implement a secondary transmission channel, it gives full play to advantageous robustness of the vehicle-mounted emergency call system, thereby further improving redundancy. Moreover, because the vehicle-mounted emergency call system is usually provided with an output device, for example, an audio play apparatus, existing software and hardware resources may be made full use of, thereby reducing development and manufacturing costs.

BRIEF DESCRIPTION OF THE DRAWINGS

The above-mentioned and/or other aspects and advantages of the disclosure will become more apparent and more readily appreciated from the following description of various aspects in conjunction with the accompanying drawings, in which the same or similar units are denoted by the same reference numerals. In the drawings.

DETAILED DESCRIPTION OF EMBODIMENTS

The disclosure is described below more comprehensively with reference to the accompanying drawings in which schematic embodiments of the disclosure are shown. However, the disclosure may be implemented in different forms, and should not be construed as being limited to the embodiments provided herein. The embodiments provided above are intended to make the disclosure of this specification comprehensive and complete, to more comprehensively convey the scope of protection of the disclosure to those skilled in the art.

In this specification, the terms such as "include" and "comprise" indicate that in addition to the units and steps that are directly and explicitly described in the specification and claims, other units and steps that are not directly or explicitly described are not excluded in the technical solutions of the disclosure.

Unless otherwise specified, the terms such as "first" and "second" are not used to indicate sequences of units in terms of time, space, size, etc., and are only used to distinguish between the units.

In this specification, "coupled" should be construed as including a case in which electrical energy or an electrical signal is directly transmitted between two units or a case in which the electrical energy or the electrical signal is indirectly transmitted via one or more third units.

To satisfy functional requirements of autonomous driving, an automotive software system will include an increasing number of codes and software packages, while a larger storage space and stronger computing power are needed for running and storing these codes. Existing decentralized small controllers are integrated into a domain controller with an open overall architecture to streamline an architecture of a vehicle-mounted network, which becomes a trend of developing automotive electrical and electronic systems. In view of this, a high-performance controller assuming computing and control tasks of corresponding function domains is introduced into a vehicle-mounted control system.

In this specification, an automotive electronic system is divided into a number of functional blocks (hereinafter referred to as "domain" or "function domain") based on functions, and a system architecture inside each functional block is mainly constructed by a domain controller. For example, units inside each domain may be interconnected with each other via a communication bus, for example, CAN or FlexRay. Different domains may communicate with each other by using a network with high transmission performance, for example, Ethernet.

Figure 1:
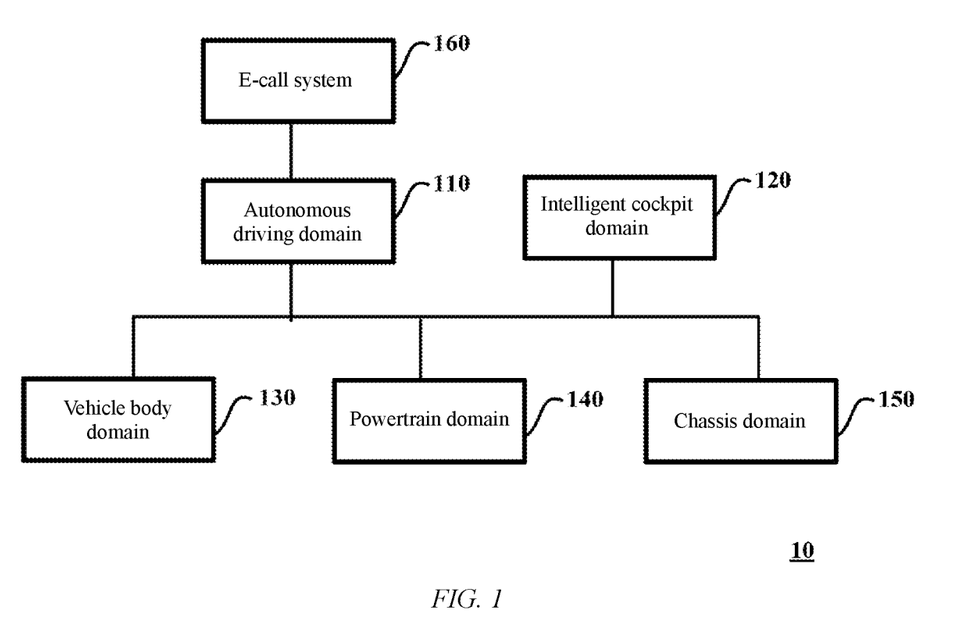
FIG. 1 is a schematic diagram of an architecture of an automotive electronic system.

The automotive electronic system may divide the function domains in various manners. FIG. 1 is a schematic diagram of an architecture of an automotive electronic system, and shows an exemplary manner of dividing functional blocks. As shown in FIG. 1, the automotive electronic system 10 includes an autonomous driving domain 110, an intelligent cockpit domain 120, a vehicle body domain 130, a powertrain domain 140, and a chassis domain 150. For example, these function domains communicate with each other via a bus (for example, Ethernet).

It should be noted that division into the above function domains is merely exemplary, and other manners are also feasible. For example, the vehicle body domain may be integrated with the intelligent cockpit domain.

The autonomous driving domain 110 provides a capability of data processing and computing, including data processing operations on devices such as a millimeter wave radar, a camera, a laser radar, a GPS, an inertial navigator, and a capability of making judgments required for autonomous driving. Further, the autonomous driving domain provides security protection of underlying core data and network connection data when a vehicle is in an autonomous driving state.

The cockpit domain 120 is configured to perform functions of an automotive cockpit electronic system, for example, an integrated system that can integrate an LCD instrument panel, central control multimedia, and passenger seat information and entertainment.

The vehicle body domain 130 is configured to perform overall control over functions of a vehicle body, and may be, for example, a conventional body control module (BCM); or on this basis, further integrate functions such as a passive entry passive start (PEPS) system, ripple anti-pinch, and an air conditioning control system.

The power domain 140 is configured to implement optimization and control of vehicle powertrain. The chassis domain 150 is configured to perform vehicle driving control, and includes, for example, an electric power steering (EPS) system, an electronic stability control (ESC) system, an electric brake booster, an airbag control system, air suspension, and a vehicle speed sensor.

Figure 2:
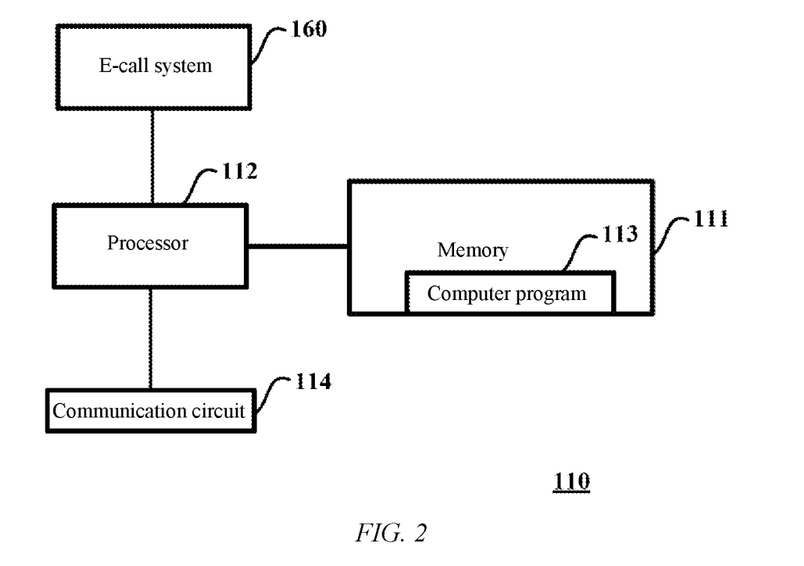
FIG. 2 is schematic block diagram of an autonomous driving domain according to an embodiment of the disclosure.

In the function domains shown in FIG. 1, the domain controller is the central part which is usually provided with powerful processing capabilities and real-time performance and a great number of communication peripherals. FIG. 2 is schematic block diagram of an autonomous driving domain according to an embodiment of the disclosure. The autonomous driving domain 110 shown in FIG. 2 includes a memory 111, a domain controller or an autonomous driving domain controller 112 (for example, a microcontroller), a computer program 113 stored in the memory 111 and executable on the domain controller 112, and a communication circuit 114.

For example, when the computer program 113 is executed on the domain controller 112, the autonomous driving domain 110 performs autonomous driving functions, including, for example, capabilities of processing, computing, and judgment of data required for autonomous driving and data security protection. In addition, in this embodiment, the computer program 113 is further executed on the domain controller 112 to perform a transfer of control over a vehicle (that is, the transfer of the control over the vehicle from the autonomous driving domain to a driver), where the transfer includes, for example, stopping exercising the control over the vehicle, displaying, to the driver via a corresponding transmission channel, a request to transfer the control over the vehicle, etc.

Figure 3:
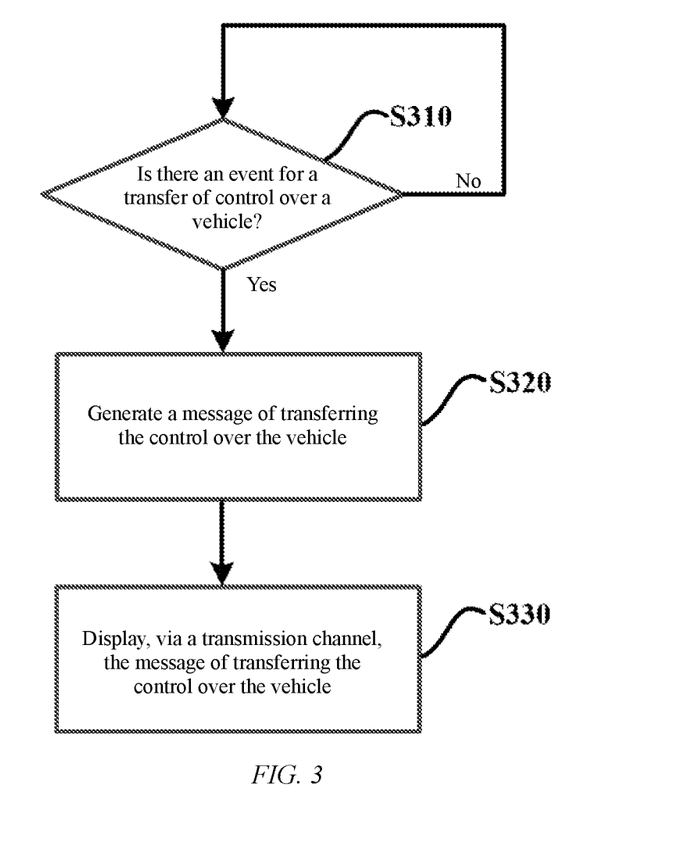
FIG. 3 is a flowchart of an implementation process of a transfer of control over a vehicle according to another embodiment of the disclosure.

FIG. 3 is a flowchart of an implementation process of a transfer of control over a vehicle according to another embodiment of the disclosure. The process may be executed in the autonomous driving domain shown in FIG. 2.

As shown in FIG. 3, in step S310, the domain controller 112 monitors whether there is an event that triggers the transfer of the control over the vehicle, and if yes, the process proceeds to step S320, otherwise monitoring continues. For example, the event that triggers the transfer of the control over the vehicle may be based on, for example, the driver assistance safety standards of L3 and L4 automation. The standards have provided specifications for ensuring operation safety, designing moving areas, and in other aspects. When there is an event that does not meet the safety standards (for example, when a processing capability of an autonomous driving system is limited), the transfer of the control over the vehicle is triggered.

In step S320, the domain controller 112 generates a request to transfer the control over the vehicle.

Then, the process proceeds to step S330. The domain controller 112 displays, via a transmission channel, the generated request to transfer the control over the vehicle, to notify the driver to take over the control over the vehicle. The display herein may be, for example, an operation that turns, via the transmission channel, the request to transfer the control over the vehicle into a form suitable for being displayed to the driver. Optionally, the form may be one of the following or a combination thereof: a sound, a vibration, a flash, an image, etc.

Optionally, in this embodiment, the request to transfer the control over the vehicle may be displayed via a first transmission channel as a primary transmission channel or a second transmission channel as a secondary transmission channel, where the first transmission channel takes priority over the second transmission channel in being used to display the request to transfer the control over the vehicle, and the second transmission channel is physically independent from the first transmission channel Optionally, the first transmission channel may be implemented by an intelligent cockpit domain (for example, the intelligent cockpit domain 120 in FIG. 1).

The physical independence herein should be understood in broad terms as that the first transmission channel will not malfunction because of a working status change of the second transmission channel, and vice versa. For example, manners of implementing the independence include, but are not limited to, using different power supplies to power the first and second transmission channels, and setting a distance between the first and second transmission channels to be long enough.

To provide first aid quickly after a road traffic accident, an emergency call system (hereinafter referred to as "vehicle-mounted emergency call system") is usually mounted on a vehicle. The vehicle-mounted emergency call system may be various Internet of vehicles emergency call systems such as an E-call system mounted following regulations of the European Commission. When there is an emergency, the vehicle-mounted emergency call system can be manually activated, or can be automatically activated via a vehicle-mounted sensor when airbags are deployed, the vehicle crashes and rolls, and so on. After the vehicle-mounted emergency call system is configured to: once being activated, information useful for rescue work, including position information, time, passenger number, a license plate number, etc., is transmitted via a voice channel to a data platform of a public safety answering center.

In this embodiment, optionally, the autonomous driving domain 110 or the domain controller 112 is coupled to the vehicle-mounted emergency call system (for example, the E-call system 160 shown in FIG. 1 and FIG. 2), such that the vehicle-mounted emergency call system is used as a secondary transmission channel. The vehicle-mounted emergency call system 160 may be considered as a component of the automotive electronic system 10, which is not necessarily the case, or may be a subsystem independent from the automotive electronic system. Usage of the vehicle-mounted emergency call system determines that the vehicle-mounted emergency call system necessarily has enough robustness (for example, the vehicle-mounted emergency call system is powered by a separate power supply and is mounted at a place that will keep it from being easily damaged), which provides good redundancy for a reliable transfer of control over a vehicle. In addition, because a vehicle-mounted emergency call system is usually a standard unit configured for a vehicle and provides a function of displaying a request (where the vehicle-mounted emergency call system is usually provided with an output device, for example, an audio play apparatus, to communicate with a remote data platform via a voice channel, and the output device may be used to display a request to transfer control over the vehicle), there is no need to add additional devices to provide redundancy, which helps reduce development and manufacturing costs.

It should be noted that in addition to the vehicle-mounted emergency call system, another apparatus may be used to implement the secondary transmission channel, for example, an audio play apparatus specially added and physically independent from the intelligent cockpit domain.

Figure 4:
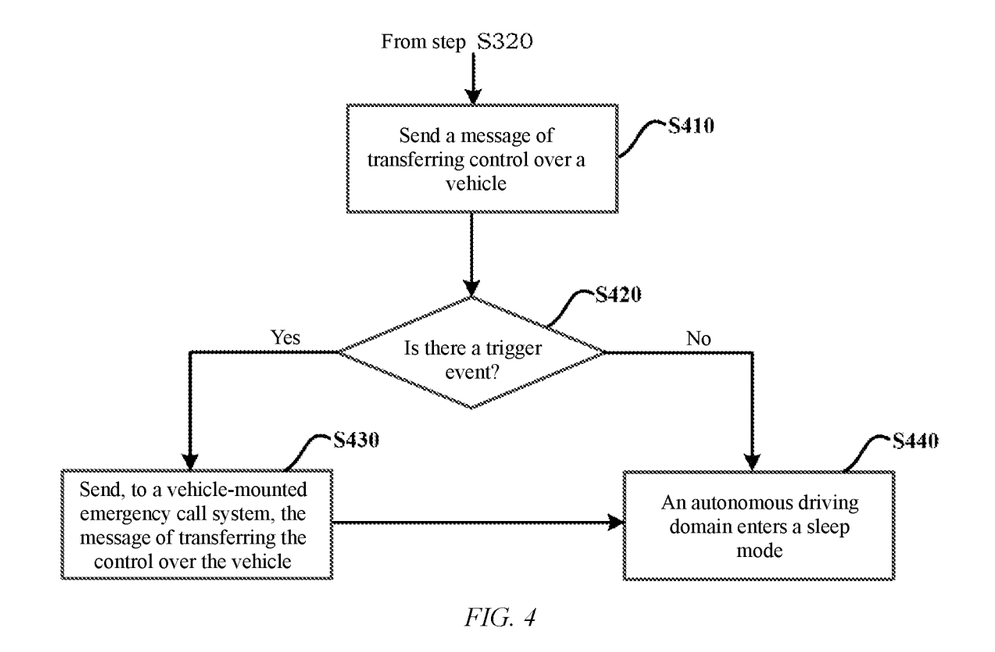
FIG. 4 is a flowchart of a process of displaying a request to transfer control over a vehicle according to another embodiment of the disclosure.

As an example, in step S330, the request to transfer the control over the vehicle may be displayed in a manner shown in FIG. 4.

Specifically, as shown in FIG. 4, in step S410, the domain controller 112 sends the request to transfer the control over the vehicle to the intelligent cockpit domain 120 via the communication circuit 114.

Then, in step S420, the domain controller 112 determines whether there is a trigger event, and if yes, the process proceeds to step S430, otherwise the process proceeds to step S440.

For example, the trigger event includes at least:
(A1) A report of the intelligent cockpit domain being in an anomalous state is received from the intelligent cockpit domain as the first transmission channel. The anomalous state herein includes various states that may cause anomaly or invalidity of the function of displaying the request to transfer the control over the vehicle, for example, includes, but is not limited to, a power supply voltage of the domain controller being out of a specified range, the memory being faulty, and the communication circuit being faulty.
(A2) A report of a failure of the output device to display the request to transfer the control over the vehicle (where for example, the audio play apparatus does not play a sound signal, or the played sound signal does not include information about the transfer of the control over the vehicle) is received from the first transmission channel
(A3) The first transmission channel has not returned a message for acknowledging that the request to transfer the control over the vehicle is received.

In step S430, the domain controller 112 sends, to the vehicle-mounted emergency call system 160 via the communication circuit 114, the request to transfer the control over the vehicle, so that the vehicle-mounted emergency call system displays, to the driver, the request to transfer the control over the vehicle. For example, a voice apparatus of the vehicle-mounted emergency call system may be used to play a voice signal including the information about the transfer of the control over the vehicle. The process proceeds to step S440 after step S430 is performed.

In step S440, the autonomous driving domain 110 enters a sleep mode (that is, stops performing an autonomous driving function).

Figure 5:
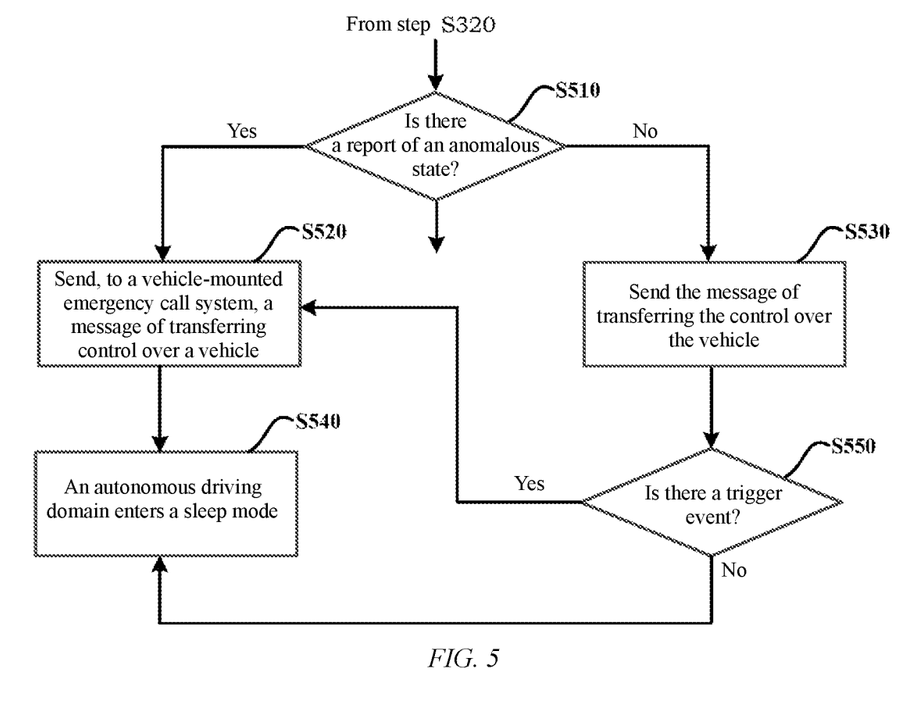
FIG. 5 is a flowchart of a process of displaying a request to transfer control over a vehicle according to another embodiment of the disclosure.

As another example, in step S330, the request to transfer the control over the vehicle may be displayed in a manner shown in FIG. 5.

Specifically, as shown in FIG. 5, in step S510, the domain controller 112 determines whether the report of the intelligent cockpit domain being in an anomalous state is received from the intelligent cockpit domain as the first transmission channel. If the report is received, the process proceeds to step S520, otherwise the process proceeds to step S530. Optionally, the first transmission channel or the intelligent cockpit domain may periodically report a status of itself to the domain controller 112; or the first transmission channel or the intelligent cockpit domain may report a status of itself to the domain controller 112 in response to a fault.

In step S520, the domain controller 112 sends, to the vehicle-mounted emergency call system 160 via the communication circuit 114, the request to transfer the control over the vehicle, so that the vehicle-mounted emergency call system displays, to the driver, the request to transfer the control over the vehicle.

The process proceeds to step S540 after step S520 is performed. In step S540, the autonomous driving domain 110 enters a sleep mode (that is, stops performing an autonomous driving function).

Another branch step of step S510 is S530. In this step, the domain controller 112 sends the request to transfer the control over the vehicle to the intelligent cockpit domain 120 via the communication circuit 114.

Then, the process proceeds to step S550, the domain controller 112 determines whether there is a trigger event, and if yes, the process proceeds to step S520, otherwise the process proceeds to step S540.

For example, the trigger event includes at least:
(B1) A report of a failure of the output device to display the request to transfer the control over the vehicle (where for example, the audio play apparatus does not play a sound signal, or the played sound signal does not include information about the transfer of the control over the vehicle) is received from the first transmission channel
(B2) The first transmission channel has not returned a message for acknowledging that the request to transfer the control over the vehicle is received.

Figure 6:
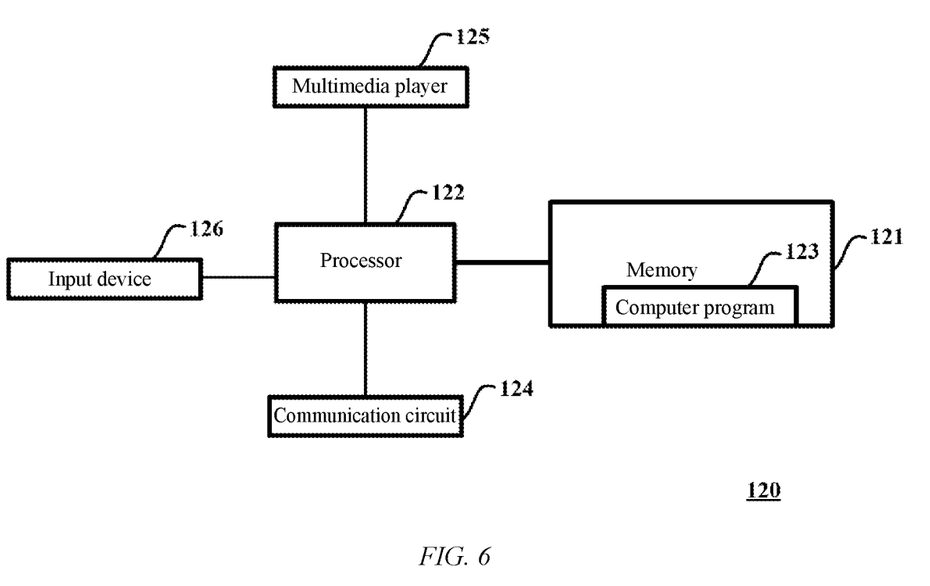
FIG. 6 is schematic block diagram of an intelligent cockpit domain according to an embodiment of the disclosure.

FIG. 6 is schematic block diagram of an intelligent cockpit domain according to another embodiment of the disclosure. The intelligent cockpit domain 120 shown in FIG. 6 includes a memory 121, a domain controller or an autonomous driving domain controller 122 (for example, a microcontroller), a computer program 123 stored in the memory 121 and executable on the domain controller 122, a communication circuit 124, a multimedia player 125, and an input device 126 (for example, a microphone).

For example, when the computer program 123 is executed on the domain controller 121, the intelligent cockpit domain 120 performs various functions of an automotive cockpit electronic system. In addition, in this embodiment, the computer program 123 is further executed on the domain controller 122 to perform a transfer of control over a vehicle (that is, the transfer of the control over the vehicle from the autonomous driving domain to a driver).

Figure 7:
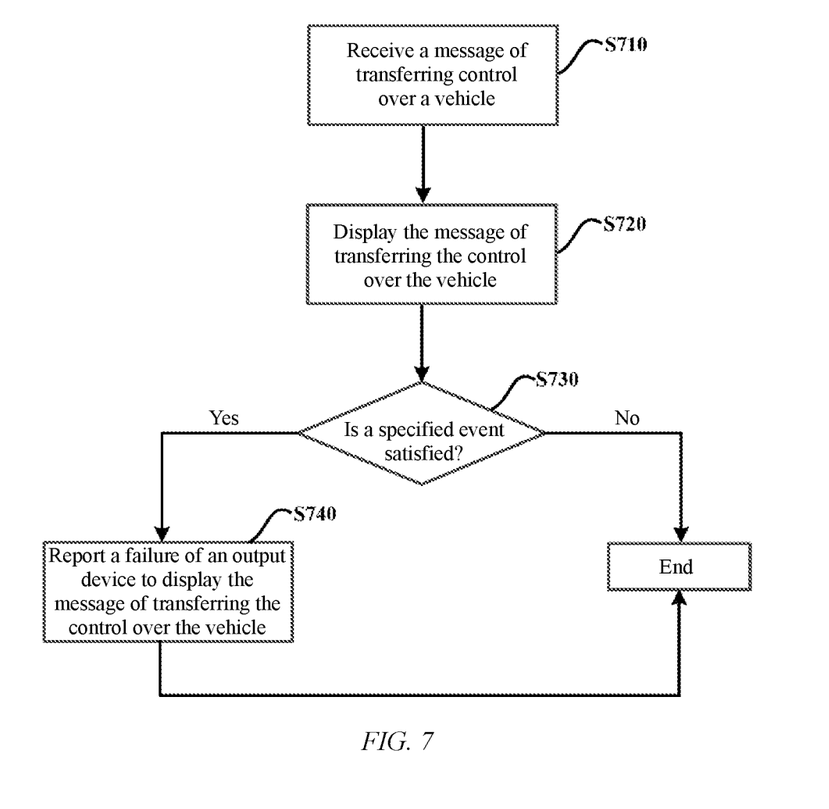
FIG. 7 is a flowchart of an implementation process of a transfer of control over a vehicle according to another embodiment of the disclosure.

FIG. 7 is a flowchart of an implementation process of a transfer of control over a vehicle according to another embodiment of the disclosure. The process may be executed in the intelligent cockpit domain shown in FIG. 6.

As shown in FIG. 7, in step S710, the domain controller 122 receives a request to transfer the control over the vehicle from the autonomous driving domain 110 via the communication circuit 124.

Then, the process proceeds to step S720. The domain controller 122 indicates the multimedia player 125 to display the request to transfer the control over the vehicle. Optionally, a form of displaying may be one of the following or a combination thereof: a sound, a vibration, a flash, an image, etc.

Then, the process proceeds to step S730. The domain controller 122 determines whether a specified condition is satisfied, and if it is satisfied, the process proceeds to step S740. For example, the process proceeds to step S740 if either of the following conditions is satisfied:

the input device 126 has not received a sound signal played by the multimedia player; or the sound signal received by the input device 126 does not include information about the transfer of the control over the vehicle.

In step S740, the domain controller 122 sends, to the autonomous driving domain 110 via the communication circuit 124, a report of a failure of the output device to display the request to transfer the control over the vehicle.

According to another aspect of the disclosure, there is further provided a computer-readable storage medium storing a computer program thereon, where when the program is executed by a processor, the steps included in the method described above by means of FIG. 3 to FIG. 5 and FIG. 7 can be implemented.

The computer-readable storage medium in the disclosure includes various types of computer storage media, and may be any usable medium accessible to a general-purpose or special-purpose computer. For example, the computer-readable storage medium may include a RAM, a ROM, an EPROM, an EPROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor. Data is usually copied magnetically in a disk used herein, while data is usually copied optically by using lasers in a disc. A combination thereof shall also fall within the scope of protection of the computer-readable storage medium. For example, the storage medium is coupled to a processor, so that the processor can read information from and write information to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

Those skilled in the art can understand that various illustrative logical blocks, modules, circuits, algorithm steps described in this specification may be implemented as electronic hardware, computer software, or a combination thereof.

To demonstrate interchangeability between the hardware and the software, various illustrative parts, blocks, modules, circuits, and steps above have been described comprehensively based on their functionalities. Whether to implement such functionalities in a form of hardware or software depends on specific application and design constrains imposed on an overall system. Those skilled in the art may implement the described functionalities for specific and particular application based on manners of change. However, determination of such an implementation should not be understood as a departure from the scope of the disclosure.

Although only some specific embodiments of the disclosure are described, those of ordinary skill in the art should understand that the disclosure may be implemented in many other forms without departing from the essence and scope of the disclosure. Therefore, the presented examples and embodiments are deemed as illustrative rather than restrictive, and without departing from the spirit and scope of the disclosure defined by the appended claims, the disclosure may cover various modifications and substitutions.

The embodiments and examples proposed herein are provided to describe as adequately as possible embodiments according to the technology and specific applications thereof and thus enable those skilled in the art to implement and use the disclosure. However, those skilled in the art will know that the above descriptions and examples are provided only for description and illustration. The proposed description is not intended to cover all aspects of the disclosure or limit the disclosure to the disclosed precise forms.

The invention claimed is:

1. An automotive electronic system, comprising a first control domain and a second control domain that are communicatively coupled to each other, wherein the first control domain comprises a first memory, a first domain controller, and a first computer program stored on the first memory and executable on the first domain controller, and the first computer program is executed to:
  generate, in response to an event that triggers a transfer of control over a vehicle, a request to transfer the control over the vehicle; and
  display, via the second control domain of a first transmission channel or via a second transmission channel, the request to transfer the control over the vehicle,
  wherein the first transmission channel takes priority over the second transmission channel in being used to display the request to transfer the control over the vehicle, and
  wherein the second transmission channel is redundant from the second control domain,
  wherein the transfer of control over the vehicle comprises the transfer of the control over the vehicle from an autonomous driving domain to a driver,
  wherein the second transmission channel is a vehicle-mounted emergency call system.

2. The automotive electronic system according to claim 1, wherein the first control domain and the second control domain are an autonomous driving domain and an intelligent cockpit domain respectively.

3. The automotive electronic system according to claim 2, further comprising an output device associated with the second control domain, wherein the first computer program is executed to display the request to transfer the control over the vehicle in the following manner:
  sending the request to transfer the control over the vehicle to the second control domain, so that the second control domain displays the request to transfer the control over the vehicle; or
  sending, via the second transmission channel in response to one of the following trigger events, the request to transfer the control over the vehicle, so that the second transmission channel displays the request to transfer the control over the vehicle;
  a report of the second control domain being in an anomalous state is received from the second control domain;
  a report of a failure of the output device to display the request to transfer the control over the vehicle is received from the second control domain; and
  the second control domain has not returned a message for acknowledging that the request to transfer the control over the vehicle is received.

4. The automotive electronic system according to claim 3, wherein the second control domain comprises a second memory, a second domain controller, and a second computer program stored on the second memory and executable on the second domain controller, and the second computer program is executed to:

determine whether a sound signal output by the output device is received or whether the sound signal comprises information about the transfer of the control over the vehicle; and if the sound signal output by the output device or the sound signal does not comprise the information about the transfer of the control over the vehicle, generate the report of a failure of the output device to display the request to transfer the control over the vehicle.

5. A vehicle, comprising the automotive electronic system according to claim 4.

6. The automotive electronic system according to claim 3, wherein the anomalous state comprises at least one of the following: a power supply voltage of the second domain controller being out of a specified range, the second memory being faulty, and a communication circuit in the second control domain being faulty.

7. The automotive electronic system according to claim 1, wherein the second control domain and the second transmission channel are powered by power supplies independent from each other.

8. A vehicle, comprising the automotive electronic system according to claim 1.

9. The automotive electronic system according to claim 1, wherein the first control domain and the second control domain are an autonomous driving domain and an intelligent cockpit domain respectively.

10. The automotive electronic system according to claim 1, wherein the second control domain and the second transmission channel are powered by power supplies independent from each other.

11. A method for transferring control over a vehicle in an automotive electronic system, wherein the automotive electronic system comprises a first control domain and a second control domain that are communicatively coupled to each other, and the method comprises the following steps:

generating, by the first control domain in response to an event that triggers a transfer of control over a vehicle, a request to transfer the control over the vehicle; and displaying, by the first control domain via the second control domain of a first transmission channel or via a second transmission channel, the request to transfer the control over the vehicle, wherein the first transmission channel takes priority over the second transmission channel in being used to transmit the request to transfer the control over the vehicle, and wherein the second transmission channel is redundant from the second control domain, wherein the transfer of control over the vehicle comprises the transfer of the control over the vehicle from an autonomous driving domain to a driver, wherein the second channel is implemented by a vehicle-mounted emergency call system.

12. The method according to claim 11, wherein the first control domain and the second control domain are an autonomous driving domain and an intelligent cockpit domain respectively.

13. The method according to claim 12, wherein the step of displaying the request to transfer the control over the vehicle comprises:

sending, by the first control domain, the request to transfer the control over the vehicle to the second control domain, so that the second control domain displays the request to transfer the control over the vehicle; or sending, by the first control domain via the second transmission channel in response to one of the following trigger events, the request to transfer the control over the vehicle, so that the second transmission channel displays the request to transfer the control over the vehicle:

a report of the second control domain being in an anomalous state is received from the second control domain;

a report of a failure of the output device of the automotive electronic system to display the request to transfer the control over the vehicle is received from the second control domain; and the second control domain has not returned a message for acknowledging that the request to transfer the control over the vehicle is received.

14. The method according to claim 13, wherein the report of a failure of the output device to display the request to transfer the control over the vehicle is generated by the second control domain in the following manner:

determining whether a sound signal output by the output device is received or whether the sound signal comprises information about the transfer of the control over the vehicle; and if the sound signal output by the output device or the sound signal does not comprise the information about the transfer of the control over the vehicle, generating the report of a failure of the output device to display the request to transfer the control over the vehicle.

15. The method according to claim 13, wherein the anomalous state comprises at least one of the following: a power supply voltage of a domain controller in the second control domain being out of a specified range, a memory in the second control domain being faulty, and a communication circuit in the second control domain being faulty.

16. The method according to claim 11, wherein the second control domain and the second transmission channel are powered by different power supplies to be physically independent.

17. A computer-readable storage medium storing a computer program thereon, wherein the computer program, when executed by a processor, implements the method according to claim 11.

18. The method according to claim 11, wherein the second control domain and the second transmission channel are powered by different power supplies to be physically independent.

* * * * *